United States Patent [19]

Zeidler

[11] Patent Number: 5,268,775
[45] Date of Patent: Dec. 7, 1993

[54] CONTRAST ENHANCEMENT AND GHOST ELIMINATION, FOR REFLECTIVE LIGHT VALVE SYSTEM

[75] Inventor: Peter A. Zeidler, San Marcos, Calif.

[73] Assignee: Hughes-JVC Technology Corporation, Carlsbad, Calif.

[21] Appl. No.: 995,568

[22] Filed: Dec. 22, 1992

Related U.S. Application Data

[63] Continuation of Ser. No. 656,896, Feb. 19, 1991, abandoned.

[51] Int. Cl.⁵ .................. G02F 1/133; G03B 21/00
[52] U.S. Cl. .................. 359/40; 359/65; 359/73; 359/495; 353/122
[58] Field of Search ............ 350/337, 342, 345, 338, 350/352, 399, 405; 353/31, 34, 37, 20, 33, 81, 122; 358/60, 61, 252; 359/250, 253, 256, 40, 41, 63, 65, 73, 493–496

[56] References Cited

U.S. PATENT DOCUMENTS

| | | | |
|---|---|---|---|
| 4,007,979 | 2/1977 | Coblitz | 359/493 |
| 4,060,833 | 11/1977 | Onyshkevych | 358/188 |
| 4,088,400 | 5/1978 | Assouline et al. | 359/41 |
| 4,100,496 | 7/1978 | Akiyoshi et al. | 325/369 |
| 4,110,004 | 8/1978 | Bocker | 350/162 |
| 4,124,278 | 11/1978 | Grinberg et al. | 350/342 |
| 4,127,322 | 11/1978 | Jacobson et al. | 350/342 |
| 4,198,123 | 4/1980 | Kremen | 350/157 |
| 4,343,535 | 8/1982 | Bleha et al. | 350/342 |
| 4,364,093 | 12/1982 | Holmes | 358/167 |
| 4,374,400 | 2/1983 | Holmes | 358/167 |
| 4,641,035 | 2/1987 | Suzuki et al. | 250/548 |
| 4,657,348 | 4/1987 | Ziegler | 359/65 |
| 4,686,569 | 8/1987 | Campbell et al. | 358/167 |
| 4,688,096 | 8/1987 | Campbell et al. | 358/167 |
| 4,798,448 | 1/1989 | van Raalte | 350/339 F |
| 4,832,469 | 5/1989 | Noguchi et al. | 350/404 |
| 4,864,390 | 9/1989 | McKechnie et al. | 350/345 |
| 4,882,594 | 11/1989 | Plummer | 346/108 |
| 4,995,718 | 2/1991 | Jachimowicz et al. | 353/33 |
| 5,066,108 | 11/1991 | McDonald | 359/73 |

FOREIGN PATENT DOCUMENTS 63-123018  5/1988  Japan.
2-160208  6/1990  Japan.

OTHER PUBLICATIONS

J. M. Haggerty et al., "Stereoscopic Large Screen Displays Using Liquid Crystal Light Valve Projectors"; Proceedings of the SPIE, vol. 1255, Feb. 14, 1990: Large Screen Projection Displays II, Session 4, pp. 114–122.

*Primary Examiner*—William L. Sikes
*Assistant Examiner*—Tai V. Duong
*Attorney, Agent, or Firm*—Harness, Dickey & Pierce

[57] ABSTRACT

A reflective liquid crystal light valve projection system employs a polarizing beam splitter (16) to reflect light from a high intensity arc lamp (10) to a liquid crystal light valve (34) that is controlled by an image generator (36). Light reflected from the liquid crystal light valve is transmitted through the polarizing beam splitter (16) to a projection lens (38) and projected on a screen. Ghost images of the arc lamp source and diminished contrast are caused by light reflected from surfaces of the lens elements back to the liquid crystal light valve and then retroreflected back through the lens. The ghost images and diminished contrast are eliminated by interposing a broad band quarter wave plate between the lens and the polarizing beam splitter.

3 Claims, 2 Drawing Sheets

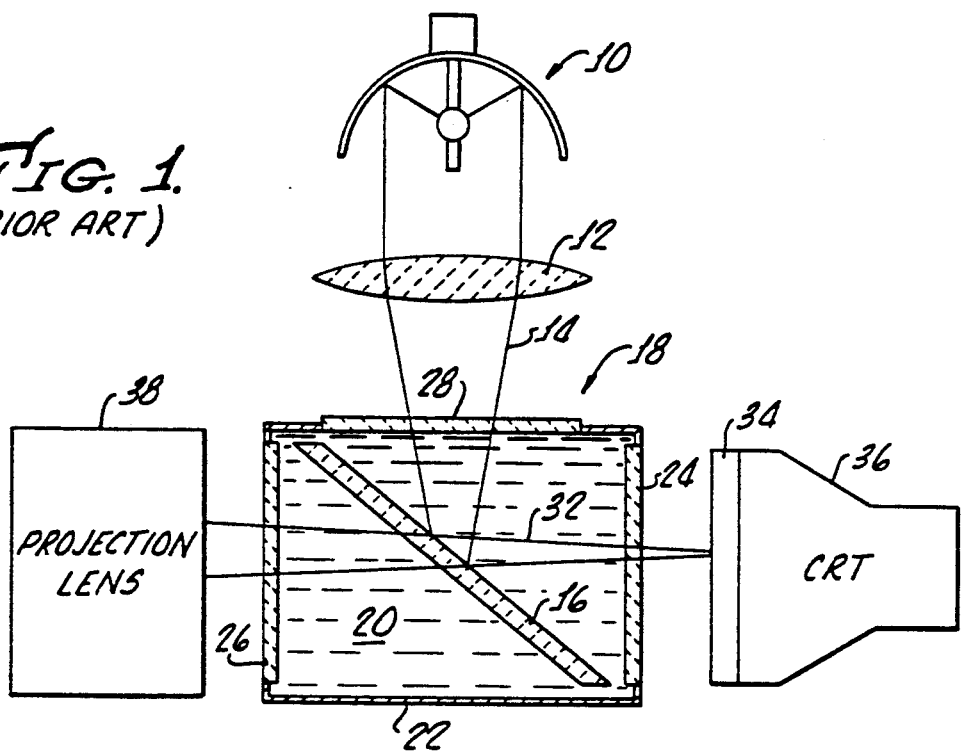
FIG. 1.
(PRIOR ART)
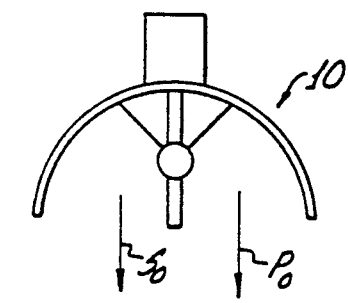
FIG. 2.
(PRIOR ART)
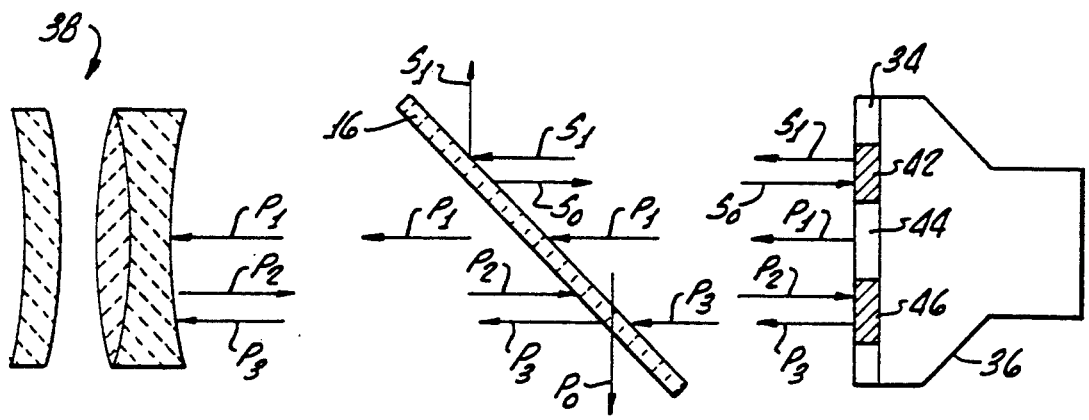

CONTRAST ENHANCEMENT AND GHOST ELIMINATION, FOR REFLECTIVE LIGHT VALVE SYSTEM

This is a continuation of application Ser. No. 656,896, filed Feb. 19, 1991, now abandoned.

BACKGROUND OF THE INVENTION

1. Field of the Invention

This invention relates to reflective light valve systems and more particularly concerns contrast enhancement and ghost elimination for a liquid crystal light valve projection system.

2. Description of the Related Art

The liquid crystal light valve is a thin film, multi layer structure comprising a liquid crystal layer, a dielectric mirror, a light blocking layer and a photo-responsive layer sandwiched between two transparent electrodes. In an LCLV projection system, a polarized projection beam is directed through the liquid crystal layer to the dielectric mirror. An input image of low intensity light, such as that generated by a cathode ray tube, is applied to the photo-responsive layer, thereby switching the electric field across the electrodes from the photo-responsive layer onto the liquid crystal layer to activate the liquid crystal. Linearly polarized projection light, from a high power light source, passes through the liquid crystal layer and is reflected from the dielectric mirror to be polarization-modulated in accordance with the light information incident on the photo-responsive layer. Therefore, if a complex distribution of light, for example a high resolution input image, is focused onto the photoconductor surface, the device converts the image into a replica image which can be reflected for projection with magnification to produce a high brightness image on a viewing screen. Projection systems of this type are described in several U.S. patents, including U.S. Pat. No. 4,650,286 to Koda, et al for Liquid Crystal Light Valve Color Projector, U.S. Pat. No. 4,343,535 to Bleha, Jr. for Liquid Crystal Light Valve, U.S. Pat. No. 4,127,322 to Jacobsen, et al for High Brightness Full Color Image Light Valve Projection System, and U.S. Pat. No. 4,191,456 to Hong et al for Optical Block for High Brightness Full Color Video Projection System.

The very high brightness of the high power light source employed in such systems introduces problems that may degrade contrast of the projected image and provide a display of ghost images of the light source. Although the lens elements of the projection lens are provided with anti-reflective coatings, and thus reflect but a very small percentage of light impinging thereon, even this small percentage of reflected light from the high brightness source is sufficient to be reflected by the OFF state of the light valve back onto the projection screen. This causes ghosts which are unwanted images of the arc lamp light source and its reflector at the projection screen and are most noticeable in black areas of the screen when only a portion of the screen is white. The unwanted ghost is that portion of light retroreflecting from the air glass interface of a lens element, which then forms a focused image of the arc lamp back on the light valve surface. This image is reflected by the liquid crystal light valve through the lens and continues onto the screen. The problem is related to the lens element surface of all lenses which form arc lamp images back onto the valve mirror which then are imaged by the projection lens onto the screen.

Ghost image intensity has been reduced by means of high efficiency, anti-reflection coatings on the lens elements. However, even a fraction of one percent of the very bright arc lamp source can still be highly visible when projected on to dark areas of the screen and will result in an overall loss of contrast and possible distracting image of the lamp and its reflector on the screen.

Accordingly, it is an object of the present invention to provide a reflective liquid crystal light valve projection system which avoids or minimizes above mentioned problems.

SUMMARY OF THE INVENTION

In carrying out principles of the present invention in accordance with a preferred embodiment thereof, light reflected from all surfaces of all elements of the projection lens is prevented from being transmitted back to the liquid crystal light valve. This is achieved by changing the polarization state of such light so as to prevent it from being re-transmitted back through the polarizing beam splitter of the system. More specifically, a quarter wave plate is positioned between the polarizing beam splitter and the projection lens, whereby light transmitted from the polarizing beam splitter to the lens has its polarization rotated 45° by the quarter wave plate, and light reflected from the lens back toward the polarizing beam splitter has its polarization rotated by an additional 45°, thereby causing such light to have a polarization state that is reflected away from the light valve by the polarizing beam splitter.

BRIEF DESCRIPTION OF THE DRAWINGS

In the accompanying drawings:

FIG. 1 is an illustration of components of a liquid crystal light valve projection system of the prior art;

FIG. 2 is a diagram of the system depicted in FIG. 1, showing various polarization states of the light reflected among the system elements.

DESCRIPTION OF THE PREFERRED EMBODIMENT

Figure 3:
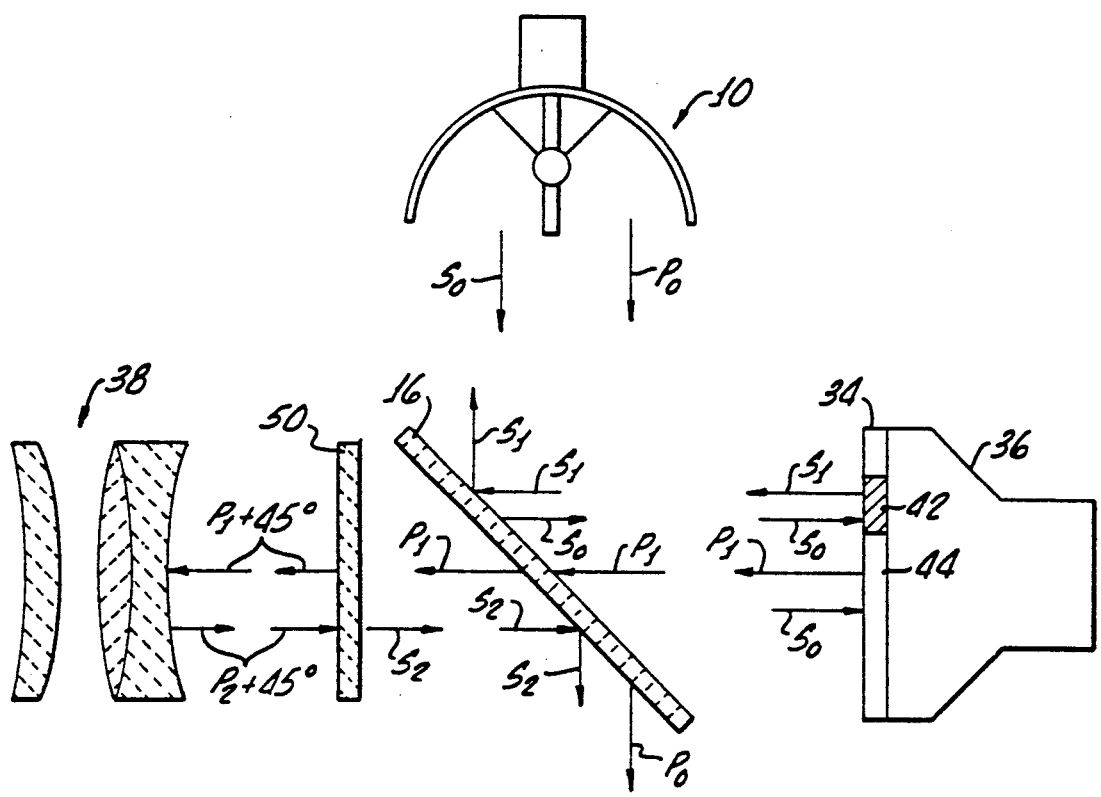
FIG. 3 shows a liquid crystal projection system with a polarization plate interposed between the polarizing beam splitter and the projection lens to enhance contrast and eliminate ghost images of the projection system lens.

FIG. 1 illustrates a liquid crystal light valve projection system of the type generally shown in U.S. Pat. No. 4,343,535 to Bleha, Jr. and U.S. Pat. No. 4,650,286 to Koda, et al. This projection system embodies a high power light source, such as a high brightness arc lamp 10, emitting unpolarized light that is transmitted through a collimating lens 12 which directs the light beam 14 to a polarizing beam splitter 18, shown as an embedded version of a MacNeille prism. The MacNeille prism is a polarizing beam splitter which accomplishes selective polarization, as generally described in the U.S. patent to MacNeille, U.S. Pat. No. 2,403,731. The embedded prism 18 schematically depicted in FIG. 1 comprises a parallel flat sided transparent prism plate 16 coated with a plurality of thin dielectric layers, as described in the MacNeille U.S. Pat. No. 2,403,731, and suspended in a prismatic fluid 20, all carried in a fluid tight housing generally indicted at 22, and having a transparent front window 24 and a transparent exit window 26.

The polarizing beam splitter 18 includes an input window 28 through which it receives randomly polarized light from arc lamp source 10. In general the beam splitter transmits light of one polarization state, such as the "P" polarization state for example, and reflects light of another polarization state, such as the polarization state "S", for example.

Reflected light of S polarization state travels along a reflected beam 32 to a liquid crystal light valve 34 that is modulated by an image generating source, such as a cathode ray tube 36. Where the screen of the cathode ray tube 36 has no phosphor emission and is therefore dark, the corresponding area of the light valve 34 remains in an off or dark state, and light is retroreflected from the dark part of the light valve 34 back to the polarizing beam splitter with its polarization state unchanged. Because the polarization of the light is unchanged from its original S state, light is again reflected from the beam splitter prism plate and returns to the light source 10. None of this light of polarization state S is transmitted by the beam splitter from the light valve 34 to the projection lens, and thus the corresponding areas imaged by the projection lens 38 remain dark. For those areas of the screen of the cathode ray tube 36 that are bright, corresponding areas of the liquid crystal light valve are in the on state or also bright. Some or all of the light reflected from such bright areas of the light valve 34 is rotated from S polarization state to P polarization state, acquiring an intensity proportional to the intensity of the light from the cathode ray tube screen. The retroreflected light of the polarization state P is transmitted from the liquid crystal light valve through the polarizing beam splitter 18, passing through the beam splitter exit window 26 and projection lens 38 to form a bright image on a projection screen (not shown).

FIG. 2 is a simplified showing of the system of FIG. 1, schematically indicating transmission and reflection of light rays of the various polarized states and arranged to illustrate certain aspects of the manner in which a ghost image or decrease in contrast may occur in this reflective liquid crystal light valve projection system.

In the simplified illustration of FIG. 2 no attempt is made to show angles of reflection of individual light rays, but arrows designated S or P with suitable subscripts are employed to illustrate the transmission and reflection of light components of polarization states S and P respectively.

As schematically illustrated in FIG. 2, the high intensity arc lamp 10 transmits unpolarized light or light of random polarization indicated by the rays $S_0$ and $P_0$ to polarizing beam splitter 16. The latter transmits light of polarization state $P_0$, as indicated in the drawing by arrow $P_0$, and reflects light of S state polarization, as indicated by the arrows $S_0$. Where the S state light $S_0$ impinges upon a dark area (corresponding to a dark area of the cathode ray tube), such as area 42 of the liquid crystal light valve 34, it is reflected without change of polarization, as indicated by the $S_1$ component, which is transmitted to the beam splitter from which it is reflected back toward the arc lamp. Where the light of polarization state S impinges upon a light area 44 of the liquid crystal light valve (corresponding to a light area of the cathode ray tube 36), such as indicated by $S_0$, it is reflected with a polarization state $P_1$ to the beam splitter. The latter transmits the light component $P_1$ of polarization state P to lens 38. This is the light that is intended to be projected by the lens system on to the screen. That is, all of the light reflected with polarization state P from the light areas of the liquid crystal light valve is desirably transmitted through the lens to the screen. However, as mentioned above, a small amount of light impinging upon the surfaces of the lens elements is reflected back toward the beam splitter, as indicated by component $P_2$. This light of polarization state P is transmitted back through the beam splitter and may impinge upon various areas of the liquid crystal light valve, depending upon the curvature of the lens and the angle of the various light rays received by the lens.

Light of polarization state P reflected from the projection lens, as indicted by arrows $P_2$, may impinge upon the dark areas, such as a dark area 46 of the liquid crystal light valve, from which it is retroreflected without change of polarization state as a light component indicated as $P_3$ in FIG. 2. The components of retroreflected light $P_3$, from the "dark" areas of the liquid crystal light valve, pass through the beam splitter back toward the lens system and are transmitted through the lens system (except for the very small percentage that once more is reflected from the lens element's surfaces) to the screen where they form a ghost image of the arc lamp and increase intensity of illumination of ideally darker areas on the projection screen, thereby diminishing contrast.

The following discussion may aid in understanding the problem presented by lens element reflection. The normal screen image is composed of light that emanates from the arc lamp, illuminates the light valve surface and is reflected selectively through the projection lens and on to the screen. The objectionable ghosts, with which the present invention is concerned, are unwanted images of the arc lamp and its reflector at the projection screen, and are most noticeable in black areas of the screen when only a portion of the screen is white.

Unlike the classical ghost image, which is the unwanted image of a star like point object, this ghost image is that of an extended source at the screen. The unwanted ghost is that portion of light re-reflecting from the air-glass interface of a lens element's surface and which then forms a focused image of the arc lamp back on the light valve surface. This image is then reflected by the valve through the lens and continues on to the screen. Even though broad band anti-reflection coatings help in controlling ghost images, the brightness of the arc lamp is so great that even a fraction of a percent of reflection is visibly noticeable at the screen.

According to the present invention the problem described above is resolved, as illustrated in FIG. 3, by interposing a quarter wave plate 50 between the beam splitter and the lens 38. The plate 50 is a broadband one quarter wave plate that will transmit light with a 45° polarization shift upon each transmission. It is active upon a broadband of visible frequencies. Light of P state polarization, indicated by components $P_1$ are retro-reflections, with changed polarization state, of the S polarization state light $S_0$ impinging upon light areas 44 of the liquid crystal light valve 34. These components $P_1$, as in the arrangement of FIG. 2, pass through the beam splitter and thence through the quarter wave plate 50 (FIG. 3). The quarter wave plate rotates the P polarization state light by 45° to provide light components designated in the drawing of FIG. 3 as $P_1+45°$. A small portion of light of the polarization state $P_1+45°$ then is reflected from the rear surfaces of elements of lens 38, in a manner similar to that previously described, with the same polarization. This is indicated in the drawing of FIG. 3 as component $P_2+45°$. The component $P_2+45°$ reflected from the lens passes through the quarter wave plate 50 a second time and is rotated an additional 45°, which effectively changes the polarization state to S, as indicated in the drawing by the component $S_2$. Components of polarization state $S_2$ are not transmitted through the beam splitter but, to the contrary, are reflected away from the liquid crystal valve and out of the system. Thus by changing the polarization state of the light from the liquid crystal light valve after the light passes through the beam splitter, even these faint reflections from the surfaces of the lens elements are prevented from reaching the liquid crystal light valve. The polarization state of light reflected from the lens is changed so that it cannot be transmitted through the beam splitter. Accordingly, this source of ghost image and contrast diminution is eliminated.

In tests made with several different lenses, light meter readings were taken at various locations to measure intensity of light impinging on the projection screen. The readings were taken with and without the quarter wave plate in place and compared to a reading of a white side of the screen where no ghost image or contrasted diminution occurred. The tests were conducted with a simulated half on/half off light valve.

Contrast ratio, which is intensity of light impinging upon a light area of the screen to intensity of light impinging upon a dark area of the screen, was increased from a value of 36:1, without the quarter wave plate, to a value of 105:1 with the quarter wave plate in position with one lens. It was increased from a value of 43:1, without the quarter wave plate, to a value of 110:1 with the quarter wave plate in place in another screen location. For a second lens the contrast ratio increased from 38:1 to 54:1. Light loss for the preferred polarization was less than 11% with the use of a quarter wave plate having no anti-reflective coating. It is preferred to employ a quarter wave plate having anti-reflective coating that will considerably decrease the loss due to the presence of the quarter wave plate.

What is claimed is:

1. A projection system comprising:
   a light source,
   a reflective liquid crystal light valve.
   image generator means for modulating light transmitted to said liquid crystal light valve,
   a projection lens,
   polarizing beam splitter means interposed between said light valve and said projection lens and between said light valve and said light source for reflecting light with a first polarization state form said light source to said liquid crystal light valve and for transmitting light reflected from said light valve and having a second polarization state to said projection lens, said projection lens having at least one surface that reflects a portion of light received from said light valve back toward said light valve, and
   means within the system interposed between said polarizing beam splitter means and a rear surface of said projection lens, said means comprising a quarter wave plate retarder adjacent to said polarizing beam splitter means for blocking transmission of that portion of light transmitted to said projection lens back to said liquid crystal light valve and then back to said projection lens and for permitting transmission of light having said second polarization state to said projection lens.

2. The projection system of claim 1 wherein said means for blocking causes light impinging upon said projection lens and reflected therefrom toward said polarizing beam splitter means to have a polarization state that causes such light to be reflected from said beam splitter means.

3. In a reflective liquid crystal light valve projection system wherein light from a light source is reflected from a polarizing beam splitter to a liquid crystal light valve that is controlled by an image generator to modulate light transmitted to and reflected from the liquid crystal light valve, and wherein light having a first polarization state is reflected from the light valve and transmitted through the polarizing beam splitter to a projection lens within the system for projection on a screen, and wherein a portion of light transmitted to the lens is reflected from the lens rear surface back to the light valve and then re-reflected to the lens as unwanted light to diminish screen contrast and produce visible ghost images, the improvement comprising:
   means within the system for preventing that portion of the light reflected from the lens surface from being transmitted to said liquid crystal light valve and then re-reflected to the screen as unwanted light, said means comprising polarization control means interposed between the lens rear surface and the polarizing beam splitter, said polarization control means comprising a quarter wave plate retarder positioned between the polarizing beam splitter and the lens whereby light transmitted from the polarizing beam splitter to the lens has its polarization rotated 45° by the quarter wave plate and light reflected from the lens to the polarizing beam splitter has its polarization rotated by an additional 45°, thereby causing light reflected from the lens to the polarizing beam splitter to have a polarization state that causes that light to be reflected from the polarizing beam splitter.

* * * * *

UNITED STATES PATENT AND TRADEMARK OFFICE
CERTIFICATE OF CORRECTION

PATENT NO. : 5,268,775
DATED : December 7, 1993
INVENTOR(S) : Peter A. Zeidler

It is certified that error appears in the above-indentified patent and that said Letters Patent is hereby corrected as shown below:

| | |
|---|---|
| Column 5, Line 42 Claim 1 | change "valve." to --valve,--. |
| Column 5, Line 49 | change "form" to --from--. |
| Column 6, Line 10 | insert after projection lens, --which is reflected from the rear surface of said projection lens--. |

Signed and Sealed this

Twenty-ninth Day of August, 1995

Attest:

BRUCE LEHMAN

*Attesting Officer*    *Commissioner of Patents and Trademarks*